United States Patent
Seitz et al.

(10) Patent No.: US 6,325,467 B1
(45) Date of Patent: Dec. 4, 2001

(54) PRESSURE CONTROL VALVE, IN PARTICULAR FOR THE PRESSURE FLUID CONTROL IN SLIP-CONTROLLED, HYDRAULIC BRAKE SYSTEMS

(75) Inventors: Karlheinz Seitz, Lorsch; Christian Schulz, Riedstadt, both of (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/582,978

(22) PCT Filed: Dec. 28, 1998

(86) PCT No.: PCT/EP98/08477

§ 371 Date: Sep. 2, 2000

§ 102(e) Date: Sep. 2, 2000

(87) PCT Pub. No.: WO99/35017

PCT Pub. Date: Jul. 15, 1999

(30) Foreign Application Priority Data

Jan. 9, 1998 (DE) .................................. 198 00 496

(51) Int. Cl.⁷ .................. B60T 8/32; B60T 8/36; F16K 17/06; F16K 17/04
(52) U.S. Cl. .................................. 303/113.1; 303/119.2
(58) Field of Search .................. 303/113.1, 119.2, 303/119.1, 84.1, 116.1, 114.1; 137/514, 514.3, 627.5, 556, 596.17; 267/204; 251/129.02

(56) References Cited

U.S. PATENT DOCUMENTS 3,072,143  1/1963  Fleischhacker .
4,542,852  9/1985  Orth et al. .
5,290,096 * 3/1994  Beck et al. ................ 303/113.1

FOREIGN PATENT DOCUMENTS

| 25 10 235 | 9/1976 | (DE) . |
| 36 32 475 | 3/1988 | (DE) . |
| 39 29 008 | 3/1991 | (DE) . |
| 40 28 606 | 3/1992 | (DE) . |
| 40 35 817 | 5/1992 | (DE) . |
| 41 29 638 | 3/1993 | (DE) . |
| 44 41 150 | 5/1996 | (DE) . |
| 196 11 832 | 10/1997 | (DE) . |
| 96 24514 | 9/1996 | (EP) . |

OTHER PUBLICATIONS

Search Report of the German Patent Office for Application No. 198 00 496.6.

* cited by examiner

Primary Examiner—Douglas C. Butler
(74) Attorney, Agent, or Firm—Rader, Fishman & Grauer PLLC

(57) ABSTRACT

The present invention relates to a pressure control valve which includes a valve tappet that is guided in a valve housing and accommodates a compression spring, and a valve closure member which is shaped on the valve tappet and corresponds with a valve seat establishes a connection between a pressure supply conduit extending from a pressure fluid source and a pressure return line when the pressure reaches a defined preset nominal value. To reduce operating noises of the valve tappet, at least one polygonal friction element which engages with the valve tappet is movable into abutment on radial friction surfaces of the valve tappet.

19 Claims, 1 Drawing Sheet

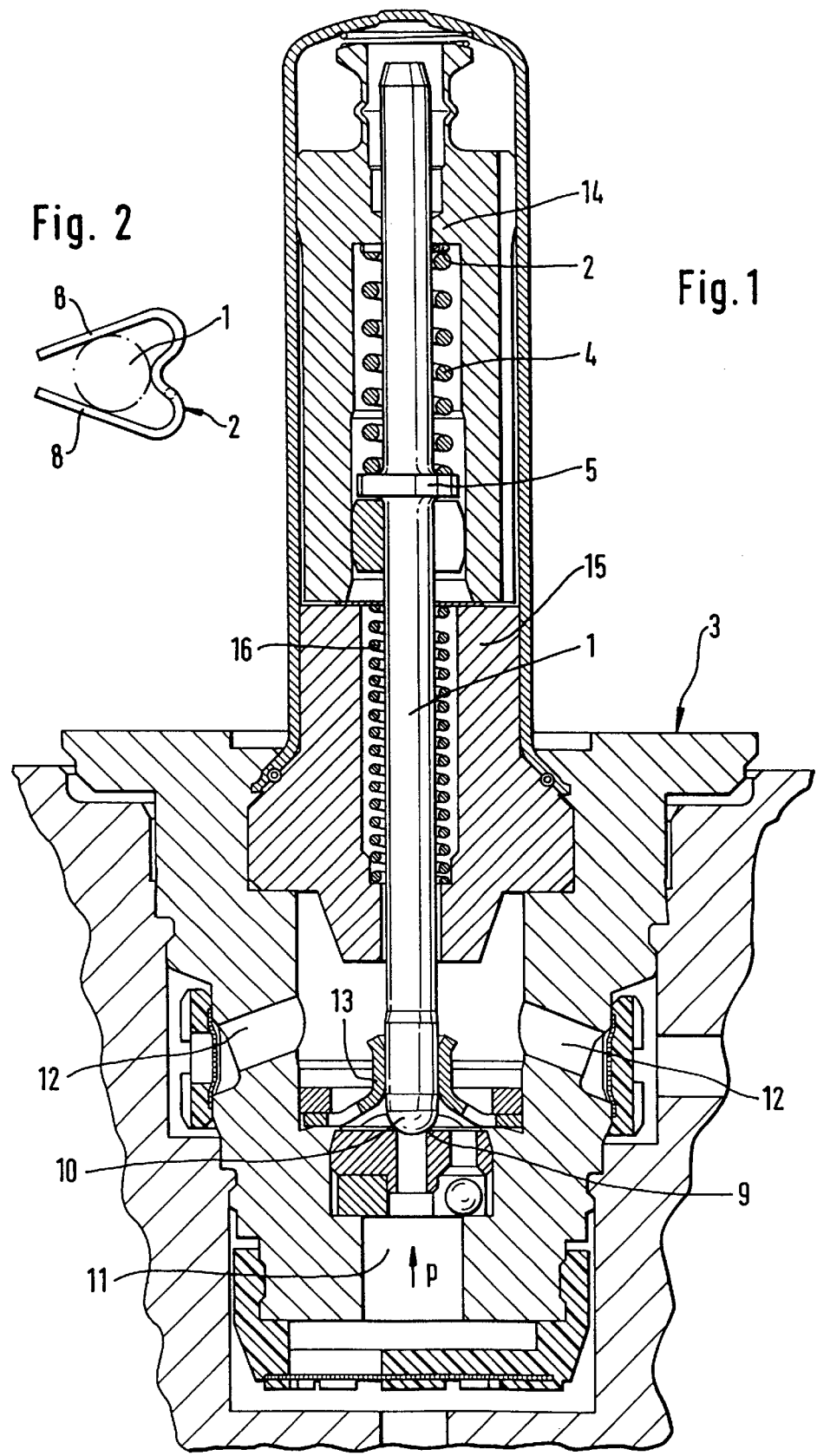

PRESSURE CONTROL VALVE, IN PARTICULAR FOR THE PRESSURE FLUID CONTROL IN SLIP-CONTROLLED, HYDRAULIC BRAKE SYSTEMS

TECHNICAL FIELD

The present invention relates to a pressure control valve, more particularly, for the pressure fluid control in slip-controlled, hydraulic brake systems.

BACKGROUND OF THE INVENTION

Such conventional, widely known pressure control valves for the flow control of fluids in slip-controlled hydraulic brake systems are used in practice in many ways.

Pressure control valves are known in the art, and DE 40 28 606 is herewith referred to as an example, which are provided with a valve tappet that is applied by spring force and guided in a valve housing for the control of the fluid. The end of the valve tappet remote from the compression spring is designed as a spherical seat valve in order to interrupt the pressure fluid connection without leakage in the valve closing position.

To minimize the development of noise during the stroke movement of the valve tappet and, hence, the bone-conduction, a friction element which abuts on the valve tappet is interposed between the compression spring and the valve housing, the said friction element damping the vibrations and, thus, the operating noises.

However, complicated machining steps are required in the manufacture of the corresponding friction element in order to ensure the desired operability under all operating conditions.

An object of the present invention is to improve a pressure control valve of the type mentioned hereinabove to such effect that a major reduction of the valve operating noise is achieved with simple low-cost means, and the reliability in operation is safeguarded in addition.

BRIEF DESCRIPTION OF THE DRAWINGS

FIG. 1 is a longitudinal cross-sectional view of a pressure control valve including a friction element that is in frictional abutment with the valve tappet.

FIG. 2 is a top view of the friction element according to the present invention.

DETAILED DESCRIPTION OF THE PREFERRED EMBODIMENTS

FIG. 1 shows a pressure control valve which is suitable for pressure fluid control in slip-controlled hydraulic brake systems, which includes a valve tappet 1 that is guided in a valve housing 3 and accommodates a compression spring 4, wherein a valve closure member 10 which is shaped on the valve tappet 1 and corresponds with a valve seat 9 establishes a connection between a pressure supply conduit 11 extending from a pressure fluid source and a pressure return line 12 when the hydraulic pressure in the pressure supply conduit 11 exceeds a defined preset nominal value of the compression spring 4 during the electromagnetic energization of the pressure control valve where the valve closure member 10 is in sealing abutment on the valve seat 9. To this end, the valve tappet 1 along with the compression spring 4 is arranged movably in a magnetic armature 14 which is likewise guided in the dome-shaped area of the valve housing 3. Further, in the area remote from the magnetic armature 14, the valve tappet 1 is guided in a magnetic core 15 and in a centering cage 13 fitted to the valve seat 9. Opening tangentially into the aperture of the valve housing 3, in a diametral arrangement, are the channels of the pressure return lines 12, which establish a connection to the pressure supply conduit 11 when the valve closure member 10 assumes its opened initial position. A spring 16 in the magnetic core 15 is supported on the magnetic armature 14 in the valve opening sense.

To dampen the developing noise, the friction element 2 which is configured as a clip, preferably similar to the shape of a heart, is compressed between the inside end wall of the magnetic armature 14 in the valve housing 3 and the compression spring 4 which abuts on the axial stop 5 of the valve tappet 1 in the magnetic armature 14. The thus compressed friction element 2 abuts with its inside surface at least in point contact on the valve tappet 1, in frictional engagement therewith.

FIG. 2 shows an enlarged top view of the friction element 2 of the present invention which has a profile cross-section that is usual for customary wires. Thus, the friction element 2 is made of a low-cost wire material which is easy and precise to manufacture and test. In the present example, the wire is plastically deformed by deflected legs 8 from its original triangular basic structure to produce a clip that has preferably a heart-type configuration, the said clip fitting closely on individual points of contact on the dash-lined circumference of the valve tappet 1 in frictional engagement therewith. The ends of the legs 8 point to one another at an acute angle, and, if necessary, they may be expanded with radii of a defined magnitude exactly as is the case at the deflection points of the legs 8. When the friction element 2 abuts on the valve tappet 1, the ends of the legs 8 are slightly spaced from each other in any case in order to utilize the elasticity of the wire material which generates the friction force. The friction element 2 chosen is favorable inasmuch as it can be preset simply and precisely to the desired friction force by a corresponding wire deformation and, subsequently, can be checked on a testing mandrel by measuring the displacement force or friction force. The abovementioned heart shape of the friction element 2, in terms of manufacture, is particularly well suited for adaption of the necessary expansion of the legs 8 in order to precisely adjust the desired friction force between the valve tappet 1 and the friction element 2. When the friction element 2 is fitted to the valve tappet 1, expansion of the legs 8 causes the wire material to yield plastically. Thus, the friction force is generally determined only by the respectively chosen wire diameter almost irrespective of the extent of the expansion.

The present invention is in no way restricted to the heart-type configuration of the friction element 2 according to FIG. 2. Equally possible would be the use of a polygonal element of a correspondingly suitable shape, in a variation of the embodiment.

What is claimed is:
1. Pressure control valve, comprising:
   a valve tappet,
   a valve housing for accommodating the valve tappet,
   a compression spring,
   a valve closure member which is shaped on the valve tappet and corresponds with a valve seat establishes a connection between a pressure supply conduit extending from a pressure fluid source and a pressure return line when the pressure reaches a defined preset nominal value, wherein at least one friction element that is in engagement with the valve tappet bears against a radial friction surface of the valve tappet, wherein the friction element has a polygonal cross-sectional shape and includes legs which contact the valve tappet in a linear fashion.

2. Pressure control valve as claimed in claim 1, wherein the friction element is compressed stationarily between the inside end wall of a magnetic armature that accommodates the valve tappet and the compression spring.

3. Pressure control valve as claimed in claim 1, wherein the friction element is made of a wire which is preferably deflected in a heart-shaped way, embracing the valve tappet like a clip and having deflected legs with radii of a defined magnitude.

4. Pressure control valve as claimed in claim 3, wherein the ends of the legs of the friction element point to one another at an acute angle and optionally have radii which determine the expansion of the friction element.

5. Pressure control valve as claimed in claim 1, wherein the ends of the legs are spaced from each other when the friction element is in abutment on the valve tappet.

6. Pressure control valve as claimed in claim 1, wherein the legs are deformed plastically after the friction element is mounted on the valve tappet.

7. Pressure control valve as claimed in claim 3, wherein the friction between the valve tappet and the friction element depends on the selected diameter of the wire.

8. Pressure control valve, comprising:

a valve tappet, a valve housing for accommodating the valve tappet, a compression spring received over the valve tappet, a valve closure member which is shaped on the valve tappet and corresponds with a valve seat establishes a connection between a pressure supply conduit extending from a pressure fluid source and a pressure return line when the pressure reaches a defined preset nominal value, and at least one friction element frictionally engaging the valve tappet, wherein the friction element has a heart cross-sectional shape that includes legs that point to one another at an acute angle and contact the valve tappet in a linear fashion.

9. Pressure control valve as claimed in claim 8, wherein the friction element is compressed stationarily between the inside end wall of a magnetic armature that accommodates the valve tappet and the compression spring.

10. Pressure control valve as claimed in claim 8, wherein the friction element is made of wire forming a clip.

11. Pressure control valve as claimed in claim 10, wherein an amount of friction force that the legs exert against the valve tappet corresponds to a diameter of the wire.

12. Pressure control valve as claimed in claim 8, wherein the ends of the legs are spaced from each other when the friction element frictionally engages the valve tappet.

13. Pressure control valve as claimed in claim 8, wherein the legs are plastically deformed when the friction element frictionally engages the valve tappet.

14. Pressure control valve, comprising:

a valve tappet, a valve housing for accommodating the valve tappet, a compression spring received over the valve tappet, a valve closure member which is shaped on the valve tappet and corresponds with a valve seat establishes a connection between a pressure supply conduit extending from a pressure fluid source and a pressure return line when the pressure reaches a defined preset nominal value, and at least one friction element frictionally engaging the valve tappet, the friction element having a heart cross-sectional shape that includes a middle portion and a pair of legs extending from the middle portion that point to one another at an acute angle such that the middle portion and the pair of legs contact the valve tappet equidistantly around an outer surface of the valve tappet.

15. Pressure control valve as claimed in claim 14, wherein the friction element is positioned between the inside end wall of a magnetic armature that accommodates the valve tappet and the compression spring.

16. Pressure control valve as claimed in claim 14, wherein the friction element is made of wire.

17. Pressure control valve as claimed in claim 16, wherein an amount of friction force that the pair of legs exert against the valve tappet corresponds to a diameter of the wire.

18. Pressure control valve as claimed in claim 14, wherein the pair of legs are spaced from each other when the friction element frictionally engages the valve tappet.

19. Pressure control valve as claimed in claim 14, wherein the pair of legs are plastically deformed when the friction element frictionally engages the valve tappet.

* * * * *